US012754344B2

(12) United States Patent
Maitrejean

(10) Patent No.: US 12,754,344 B2
(45) Date of Patent: Oct. 6, 2026

(54) INSPECTION OF CARGO IN OPEN-TOPPED VEHICLE

(71) Applicant: Smiths Detection France S.A.S., Vitry sur Seine (FR)

(72) Inventor: Serge Maitrejean, Vitry-sur-seine (FR)

(73) Assignee: SMITHS DETECTION FRANCE S.A.S., Vitry sur Seine (FR)

( * ) Notice: Subject to any disclaimer, the term of this patent is extended or adjusted under 35 U.S.C. 154(b) by 158 days.

(21) Appl. No.: 18/573,624

(22) PCT Filed: Jun. 28, 2022

(86) PCT No.: PCT/GB2022/051646
§ 371 (c)(1),
(2) Date: Dec. 22, 2023

(87) PCT Pub. No.: WO2023/275524
PCT Pub. Date: Jan. 5, 2023

(65) Prior Publication Data

US 2024/0288605 A1 Aug. 29, 2024

(30) Foreign Application Priority Data

Jul. 1, 2021 (GB) ..................................... 2109552

(51) Int. Cl.
*G01V 5/20* (2024.01)
*G01F 22/00* (2006.01)
(Continued)

(52) U.S. Cl.
CPC ................ *G01V 5/20* (2024.01); *G01F 22/00* (2013.01); *G01G 9/005* (2013.01); *G01N 23/04* (2013.01);
(Continued)

(58) Field of Classification Search
CPC ........ G01F 22/00; G01G 9/005; G01N 23/04; G01N 23/10; G01S 13/88; G01S 17/88; G01V 5/20
See application file for complete search history.

(56) References Cited

U.S. PATENT DOCUMENTS

2006/0145079 A1 7/2006 Verbinski et al.
2016/0170072 A1* 6/2016 Yaish ...................... G01N 9/24 702/179
2017/0357026 A1 12/2017 Gallagher et al.

FOREIGN PATENT DOCUMENTS

AU 2013237637 A1 4/2014
CN 109029254 A 12/2018
(Continued)

OTHER PUBLICATIONS

PCT International Search Report and Written Opinion, Application No. PCT/GB2022/051646, dated Oct. 13, 2022, 19 pages.
(Continued)

*Primary Examiner* — Mark R Gaworecki
(74) *Attorney, Agent, or Firm* — Armstrong Teasdale LLP

(57) ABSTRACT

In some examples, it is disclosed a computer-implemented method for inspecting cargo in an open-topped vehicle, including: obtaining an estimate of a volume of the cargo in the open-topped vehicle, based on data obtained from a top-observation device, the top-observation device being configured to observe a top surface of the cargo in the open-topped vehicle during a mutual movement of the open-topped vehicle and the top-observation device; determining an estimate of a mass of the cargo in the open-topped vehicle, based on the obtained volume estimate; comparing the determined mass estimate with a reference mass associated with the cargo in the open-topped vehicle; and deter-
(Continued)

mining whether the cargo in the open-topped vehicle is in conformity with the reference mass, based on the comparing.

17 Claims, 5 Drawing Sheets

(51) Int. Cl.

| | |
|---|---|
| ***G01G 9/00*** | (2006.01) |
| ***G01N 23/04*** | (2018.01) |
| ***G01N 23/10*** | (2018.01) |
| ***G01S 13/88*** | (2006.01) |
| ***G01S 17/88*** | (2006.01) |

(52) U.S. Cl.
CPC .............. *G01N 23/10* (2013.01); *G01S 13/88* (2013.01); *G01S 17/88* (2013.01)

(56) References Cited

FOREIGN PATENT DOCUMENTS

| | | | | |
|---|---|---|---|---|
| CN | 111336917 A | 6/2020 | | |
| DE | 20211181 U1 | 1/2003 | | |
| WO | WO-2017179038 A1 * | 10/2017 | ............. | G01F 22/00 |
| WO | 2019216833 A1 | 11/2019 | | |

OTHER PUBLICATIONS

UK Search Report, Application No. GB2109552.6, dated Dec. 6, 2021, 4 pps.

* cited by examiner

INSPECTION OF CARGO IN OPEN-TOPPED VEHICLE

CROSS-REFERENCE TO RELATED APPLICATIONS

The present application is a national stage entry of PCT/GB2022/051646 filed on Jun. 28, 2022, which claims the benefit of GB Patent Application No. 2109552.6 filed on Jul. 1, 2021, the contents of which are hereby incorporated by reference in their entirety.

BACKGROUND

The disclosure relates but is not limited to inspection of cargo in an open-topped vehicle, such as an open-topped gondola-type wagon or an open-topped truck trailer.

It is sometimes difficult to inspect high-density cargo or high-thickness cargo using conventional X-rays scanners, because the high-density or high-thickness cargo absorbs most of the X-rays. Therefore in some cases high-density cargo is too dense or thick to be accurately imaged by conventional X-rays scanners.

A known solution is to manually inspect the cargo, which is time-consuming.

BRIEF DESCRIPTION

Aspects of the disclosure are recited in the independent claims and additional features are recited in the dependent claims.

These and other aspects and embodiments of the disclosure are also described by reference to the following description and appended drawings.

DETAILED DESCRIPTION

Overview

The disclosure describes example techniques for inspection of cargo in an open-topped vehicle, such as an open-topped gondola-type wagon or an open-topped truck trailer.

The cargo may be any type of homogeneous cargo, such as a high-density or a high-thickness cargo as non-limiting examples. Some non-limiting types of high-thickness cargo include cargo with a thickness in g/cm$^2$ which exceeds 300 g/cm$^2$, with a density in g/cm$^3$ which is greater than 2 g/cm$^3$, such as metal ore (e.g. iron ore, copper ore) as non-limiting examples.

The disclosed example techniques may enable detection of objects of interest hidden in the cargo. Usual objects of interest (such as contraband products like cigarettes, drugs, etc.) have a much lower density (e.g. volumic mass) than high-density or high-thickness homogeneous cargo, especially metal ore. If an object of interest is hidden in such a high-density or high-thickness homogeneous cargo, the volume of the cargo which is apparent from the open-topped vehicle will be greater than that of the cargo without the object of interest.

The disclosure may be applied to any type of open-topped vehicle, where a top surface of the cargo located in the open-topped vehicle may be observed by a top-observation device during a mutual movement of the open-topped vehicle and the top-observation device.

Using observation data of the top surface, obtained from the top-observation device, an estimation of the volume of the cargo may be made. Using the volume estimation, an estimation of the mass of the cargo may be made. The mass estimate may be compared to a reference mass $M_{ref}$ of the cargo, such as a mass which has been previously declared e.g. to border officials. If the estimated mass is greater than the mass of the cargo without the object of interest, it means that the apparent volume of the cargo is not coherent with the mass of the cargo without the object of interest, and an object of interest is thus likely to be hidden in the cargo.

Similarly, alternatively or additionally, an estimation of a reference volume of the cargo may be made by dividing the reference mass $M_{ref}$ of the cargo by a density of the cargo (the density being either determined or known). The estimation of the reference volume of the cargo may be compared to the volume estimation obtained using the observation data of the top surface. If the estimation of the volume is greater than the reference volume, that is to say greater than the volume of the cargo without the object of interest, it means that the apparent volume of the cargo is not coherent with the mass of the cargo without the object of interest, and an object of interest is thus likely to be hidden in the cargo.

Figure 1:
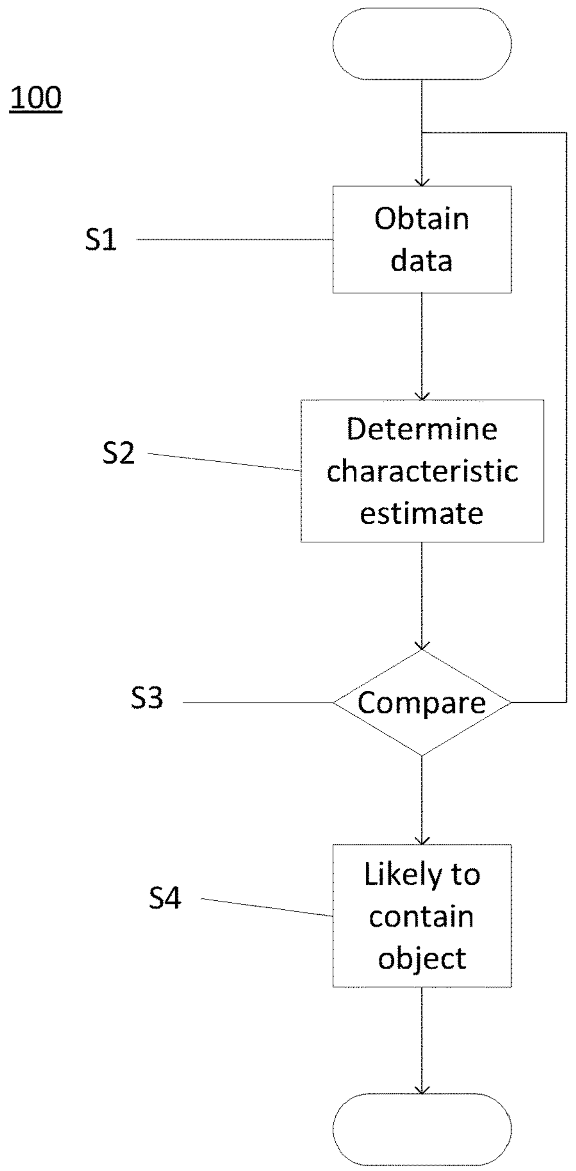
FIG. 1 schematically represents an example method according to the disclosure.

FIG. 1 schematically represents an example method 100 according to the disclosure.

Figure 2:
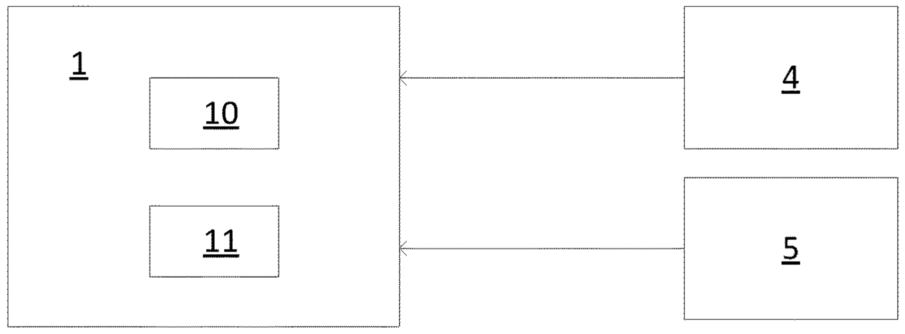
FIG. 2 schematically represents an example system according to the disclosure.

The method 100 may be implemented by a computer. As illustrated in FIG. 2, the computer may be part of a system 1 including a processor 10, and a memory 11 storing instructions which, when executed by the processor 10, enable the system 1 to perform e.g. the method 100.

Referring back to FIG. 1, the method 100 is for example directed to inspecting cargo in an open-topped vehicle.

Figure 3A:
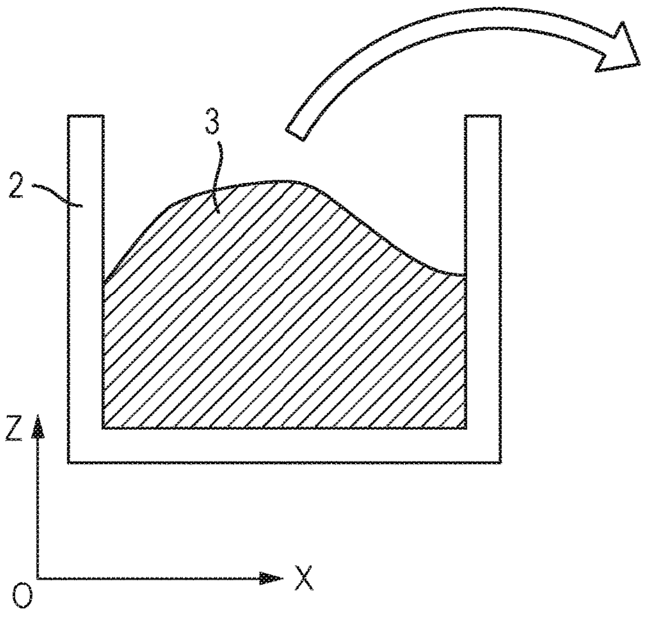
FIGS. 3A and 3B schematically represent a cross-section of an example open-topped vehicle including cargo, according to the disclosure, FIG. 3A schematically representing the cargo not including an object of interest, and FIG. 3B schematically representing the cargo including an object of interest, such as contraband.
Figure 3B:
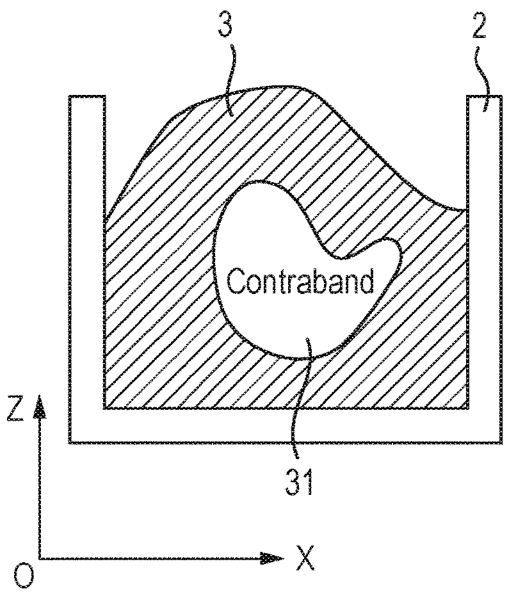

FIGS. 3A and 3B schematically represent a cross-section of an example open-topped vehicle 2 including cargo 3. FIG. 3A schematically represents the cargo 3 not including an object of interest. FIG. 3B schematically represents the cargo 3 including an object 31 of interest, such as contraband as a non-limiting example. If the object 31 of interest hidden in the cargo 3 has a lower density (e.g. volumic mass) than the cargo 3, the volume of the cargo 3 which is apparent from the open-topped vehicle 2 will be greater (FIG. 3B) than that of the cargo without the object of interest (FIG. 3A).

In some examples, the cargo 3 in the open-topped vehicle 2 includes a load of material, such as a high-density or a high-thickness material as non-limiting examples. In some examples the high-density or high-thickness material of the load may be too dense or too thick for proper transmission of ionising radiation, and the full cargo 3 (and the object 31 of interest when present) may not be accurately imaged by conventional ionising radiation scanners.

In some examples, the high-density or high-thickness material may include metal ore, such as an iron ore—but other examples of high-density or high-thickness materials may be envisaged.

The object 31 of interest may include at least one of contraband, such as cigarettes or drugs, and weapon, such as explosives. Other examples are envisaged.

The open-topped vehicle 2 may include at least one of an open-topped gondola-type wagon or an open-topped truck trailer, as non-limiting examples. It should be understood that the method 100 may apply to any type of container containing cargo, the container being with an open top.

The method 100 of FIG. 1 mainly includes obtaining, at S1, data from a top-observation device.

Figure 4:
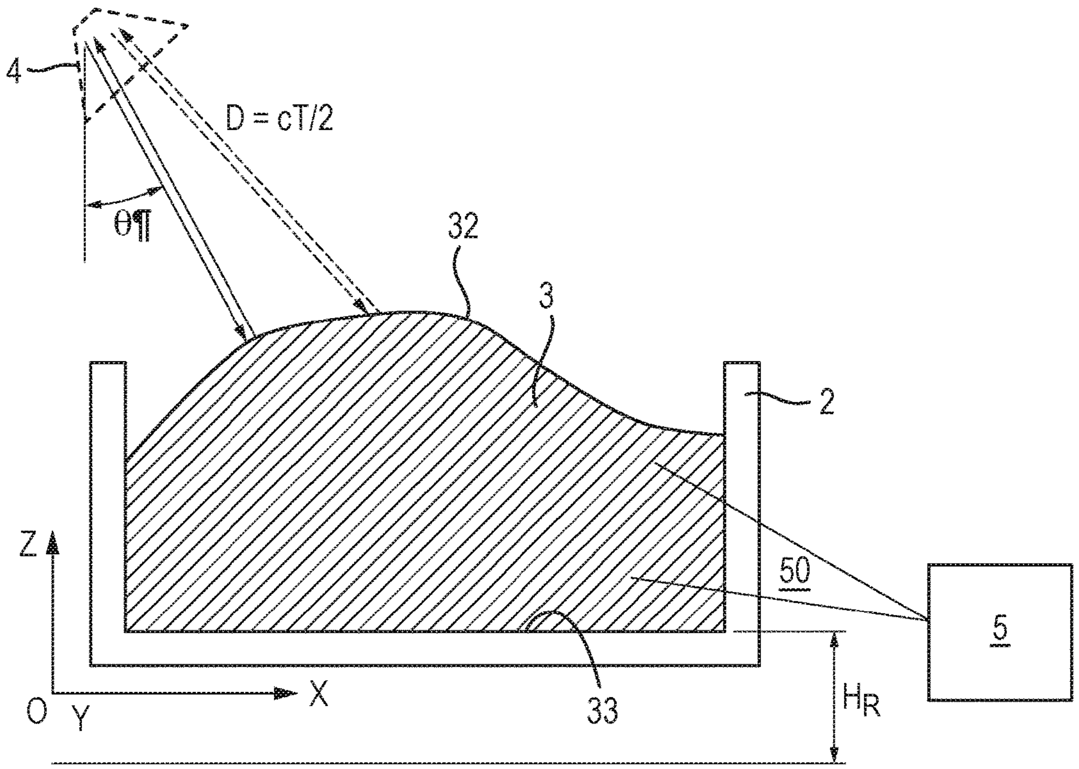
FIG. 4 schematically represents a cross-section of an example top-observation device configured to observe a top surface of the cargo in the open-topped vehicle, according to the disclosure, FIG. 5 schematically represents an example method according to the disclosure.

FIG. 4 schematically represents a cross-section of an example top-observation device 4 configured to observe a top surface 32 of the cargo 3 in the open-topped vehicle 2. The top-observation device 4 of FIG. 4 is configured to observe the top surface 32 of the cargo in the open-topped vehicle 2 during a mutual movement of the open-topped vehicle 2 and the top-observation device 4, e.g. in the (OY) direction of FIG. 4. During the mutual movement, the top-observation device 4 may be mounted fixed with respect to the ground, the open-topped vehicle 2 being mobile with respect to the ground, e.g. in the (OY) direction. Alternatively, during the mutual movement, the open-topped vehicle 2 may be fixed with respect to the ground, and the top-observation device 4 may be mobile with respect to the ground.

The method 100 of FIG. 1 may further include determining, at S2, an estimate of a characteristic of the cargo in the open-topped vehicle, based on the data obtained at S1. As explained in greater detail below, the characteristic of the cargo which may be estimated may include at least one of a volume of the cargo, a density of the cargo, and a mass of the cargo, as non-limiting examples.

The method 100 of FIG. 1 may further include comparing, at S3, the characteristic estimate determined at S2 with a reference characteristic associated with the cargo in the open-topped vehicle. In FIG. 1, step S3 may further include determining whether the cargo in the open-topped vehicle is in conformity with the reference characteristic, based on the comparing.

In the example of FIG. 1, in the method 100 comparing at S3 the characteristic estimate (such as the mass estimate or the volume estimate) determined at S2 with the reference characteristic (such as the reference mass or the reference volume, respectively) may include comparing the determined characteristic estimate with a predetermined threshold above the reference characteristic. If it is determined at S3 that the determined characteristic estimate is greater than the predetermined threshold above the reference characteristic, the method 100 further includes determining at S3 that the cargo in the open-topped vehicle is not in conformity with the reference characteristic. The method 100 proceeds to S4.

In the example of FIG. 1, the method 100 includes determining, at S4, that the cargo in the open-topped vehicle is likely to contain an object of interest.

If it is determined at S3 that the cargo in the open-topped vehicle is in conformity with the reference characteristic, the method 100 proceeds to S1 where a new open-topped vehicle may be inspected.

As illustrated in FIG. 2, the top-observation device 4 is in communication with the system 1, e.g. using wired or wireless connection. Obtaining at S1 the data may include the system 1 receiving the data from the top-observation device 4. In that example, determining at S2 the estimate of the characteristic of the cargo in the open-topped vehicle may include determining the estimate of the volume of the cargo in the open-topped vehicle, which may include the system 1 determining the volume estimate using the data received from the top-observation device 4.

Alternatively or additionally, obtaining at S1 the data may include a processor (not shown in the Figures) of the top-observation device 4 receiving the data. In that example, determining at S2 the estimate of the characteristic of the cargo in the open-topped vehicle may include determining the estimate of the volume of the cargo, which may include the system 1 receiving the volume estimate from the top-observation device 4. In other words, the top-observation device 4 may be configured to determine the volume estimate using the top-observation data.

Figure 5:
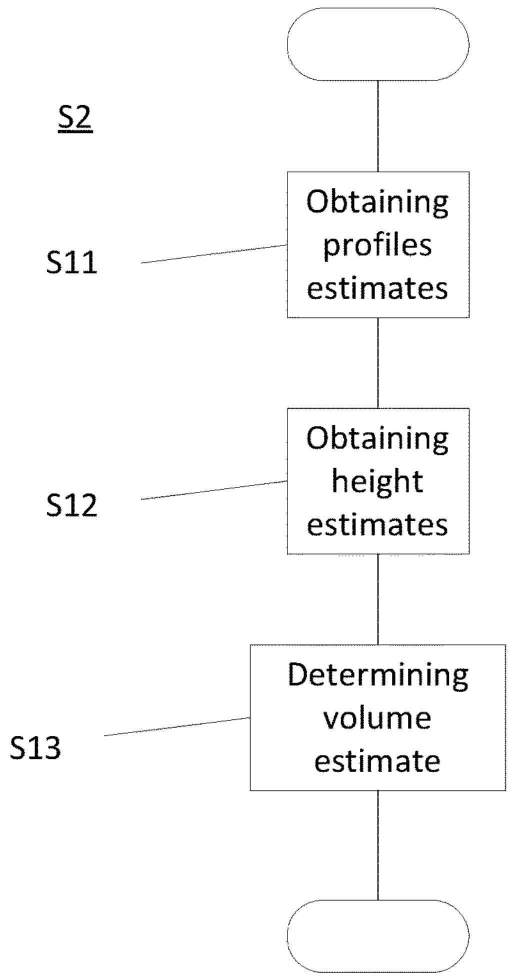

As illustrated in FIG. 5, determining at S2 the volume estimate may include:

- obtaining, at S11, estimates of profiles of the top surface of the cargo in the open-topped vehicle, based on the data obtained from the top-observation device;
- obtaining, at S12, an estimate of a height of the cargo under the top surface of the cargo in the open-topped vehicle;
- determining, at S13, the volume estimate, based on the obtained profile estimates and the obtained height estimate.

An example for obtaining, at S11, the estimates of the profiles of the top surface of the cargo in the open-topped vehicle, based on the data obtained from the top-observation device, is described below.

In some examples, the top-observation device 4 may include one or more Lidar (Light Detection and Ranging) scanners.

As illustrated in FIG. 4, the Lidar 4 may conventionally include a pulsed laser for scanning the surrounding space including the top surface 32, with a varying angle θ. For each angular position θ, a time measurement T (corresponding to a "time of flight") is captured between emission of the laser pulse by the Lidar 4 and reception by the Lidar 4 of the laser pulse reflected by the top surface 32. The captured time measurement T allows, by multiplication by the speed c of light and by division by 2 (outward and return flights of the pulse), to obtain a distance D between the top surface 32 and the top-observation device 4, at the angle θ. It is possible to locate a point of the top surface 32 in the (XOZ) plane of FIG. 4 by knowing the angle θ and the corresponding distance D. For a given mutual position of the vehicle 2 and the Lidar 4 along the axis (OY), by knowing a series of angles θ and a series of corresponding distances D, it is possible to obtain an estimate of a profile of the top surface 32 of the cargo. A series of estimates of profiles of the top surface 32 of the cargo in the open-topped vehicle may be obtained for a series of mutual positions along the axis (OY) during the mutual movement of the open-topped vehicle 2 and the top-observation device 4, in the (OY) direction.

Non-limiting examples of methods to determine one or more mutual positions of the vehicle and the top-observation device along an axis of the mutual movement of the open-topped vehicle and the top-observation device (e.g. along the axis (OY of FIG. 4) are described below.

A first example method may use data output from a speed sensor. The speed sensor may be configured to measure the mutual speed of the vehicle and the top-observation device. The speed measurements are updated periodically. The speed measurements are also time stamped. The output data may thus include information couples $(v(t_1),t_1)$, $(v(t_2), t_2)$, etc., where v is the mutual speed and $t_1$, $t_2$ are time stamps. In parallel, the top-observation device is configured to output data in the format $(x(t'_1), z(t'_1),t'_1)$, $(x(t'_2), z(t'_2),t'_2)$, etc., where x and z are the positions of a point of the top surface in the (XOZ) plane and $t'_1$, $t'_2$ are also time stamps, not necessarily the same as $t_1$ and $t_2$. Using a linear interpolation, it is possible to estimate the mutual speed at $t'_1$, $t'_2$, etc., if the speed measurements are updated frequently enough so that the mutual acceleration of the vehicle and the top-observation device is a constant between two instants of measurement—it is often the case if the vehicle is e.g. a wagon of a train. From that interpolation, the following data may be determined: $(x(t'_1),z(t'_1)$, $v(t'_1),t'_1)$, $(x(t'_2),z(t'_2)$, $v(t'_2),t'_2)$, etc. The mutual position, i.e. coordinate y along the axis (OY), may be determined from an instant to chosen as the beginning of the time reference (for example a time stamp to of the first measurement of the top-observation device), based on a parabolic formula, i.e. the acceleration is constant between two measurements, as follows:

$$y(t'_i) = y(t'_{i-1}) + v(t'_{i-1})(t'_i - t'_{i-1}) + 1/2.\,(v(t'_i) - v(t'_{i-1})).\,(t'_i - t'_{i-1}),\text{ or}$$

$$y(t'_i) = y(t'_{i-1}) + 1/2.\,(v(t'_i) + v(t'_{i-1})).\,(t'_i - t'_{i-1})$$

In cases where the side-inspection device is a matrix of detectors, a second example method may use image data from the matrix. From a processing of the image data generated during the mutual displacement of the vehicle and the side-inspection device, it is possible to calculate a pace corresponding to a number of pulses of ionizing radiation which are emitted e.g. by the side-inspection device by unit of mutual displacement (e.g. in mm), or inversely a distance (e.g. a number of mm) travelled by pulse. The frequency of the pulses being known, the distance travelled by pulse is equivalent to a mutual speed. The mutual speed being known, the mutual position may be determined as described in the first example above. An example of a method for calculating a pace is described in GB2005684.2, incorporated herein by reference.

In cases where the length of the vehicle is normalised, and assuming that the mutual speed is constant, a third example method may estimate the mutual position by measuring the time lapsed for a beginning and an end of the vehicle to pass in front of a reference, e.g. a photoelectric cell. The time stamps when the beginning and the end of the vehicle pass in front of the reference may be determined. The mutual speed and thus the mutual position may be determined based on the determined time stamps and the known length of the vehicle.

In cases where the length of the vehicle is normalised, and assuming that the mutual speed is constant, a fourth example method may estimate the mutual position by measuring the time lapsed for a beginning and an end of the vehicle to pass in front of the top-observation device, e.g. using the data from the top-observation device. Using the data in the format $(x(t'_1), z(t'_1), t'_1)$, $(x(t'_2), z(t'_2), t'_2)$, etc., output by the top-observation device, and analysing the coordinates x and z, the time stamps when the beginning and the end of the vehicle pass in front of the top-observation device may be determined. The mutual speed and thus the mutual position may be determined based on the determined time stamps and the known length of the vehicle.

It should be understood that other examples than one or more Lidars may be envisaged for the top-observation device 4, such as one or more millimetre-wave scanners. Any top-observation device configured to observe the top surface of the cargo in the open-topped vehicle during the mutual movement of the open-topped vehicle and the top-observation device may be envisaged.

An example for obtaining, at S12, the estimate of the height of the cargo under the top surface of the cargo in the open-topped vehicle is described below.

As illustrated in FIG. 4, an estimate of the height HR of the cargo 3 under the top surface 32 of the cargo in the open-topped vehicle 2 may be obtained from a knowledge of the type of the open-topped vehicle 2. In cases where the type of the open-topped vehicle 2 is normalized, the height HR corresponding to the floor of the open-topped vehicle 2 over the ground is well-known. The height estimate HR may be obtained using information from a description of the open-topped vehicle 2. In cases where the type of the open-topped vehicle 2 is not known and/or the type of the open-topped vehicle 2 is not normalized, the height estimate HR may be obtained using other techniques, such as direct measurement of the height HR (e.g. using a side-inspection device, an example of which is described in more detail below) and/or by side observation, e.g. by an operator of the system 1.

At S13, the volume estimate (corresponding to the hashed volume in FIG. 4) may be determined, based on the profile estimates obtained at S11 and the height estimate obtained at S12.

Examples of methods for further determining, at S2, the estimate of the mass of the cargo in the open-topped vehicle, based on the volume estimate obtained at S2 are described below.

As illustrated in FIG. 2, the system 1 may be in communication with a side-inspection device 5, e.g. using wired or wireless connection.

As illustrated in FIG. 4, the side-inspection device 5 is configured to inspect the cargo 3 using ionizing radiation 50 during a mutual movement of the open-topped vehicle 2 and the side-inspection device 5, e.g. in the (OY) direction. In some examples the side-inspection device 5 includes an ionizing radiation scanner 5 (e.g. using X-rays as a non-limiting example), mounted fixed with respect to the ground, the open-topped vehicle 2 being mobile with respect to the ground, e.g. in the (OY) direction. Alternatively, during the mutual movement, in some examples the side-inspection device 5 may be mobile with respect to the ground, e.g. in the (OY) direction, the open-topped vehicle 2 may be fixed with respect to the ground.

In example methods, determining at S2 the mass estimate of the cargo in the open-topped vehicle may further include obtaining an estimate of the density (i.e. volumic mass) of the cargo in the open-topped vehicle.

In some examples, obtaining the estimate of the density may include the system 1 determining the density estimate using data received from the side-inspection device 5. Alternatively or additionally, obtaining the estimate of the density may include the system 1 receiving the density estimate from the side-inspection device 5. In other words, the side-inspection device 5 may be configured to determine the density estimate using side-inspection data.

Alternatively or additionally, in some cases, the type of the cargo 3 may be known: e.g. it may be known that the cargo 3 is iron ore, because the cargo is provided by a regular provider—e.g. a known mining company. In such cases, a reference density (e.g. obtained using information from a description of the cargo 3 by the provider) or a density estimate (e.g. obtained by a measurement using any means other than the side-inspection device 5 and/or an estimation using information from an observation of the cargo 3, e.g. by an operator of the system 1) may also be predetermined. In the cases where the type of the cargo is known, obtaining the estimate of the density may include the system 1 assigning at least one of the predetermined reference density or the predetermined density estimate to the density estimate.

Figure 6:
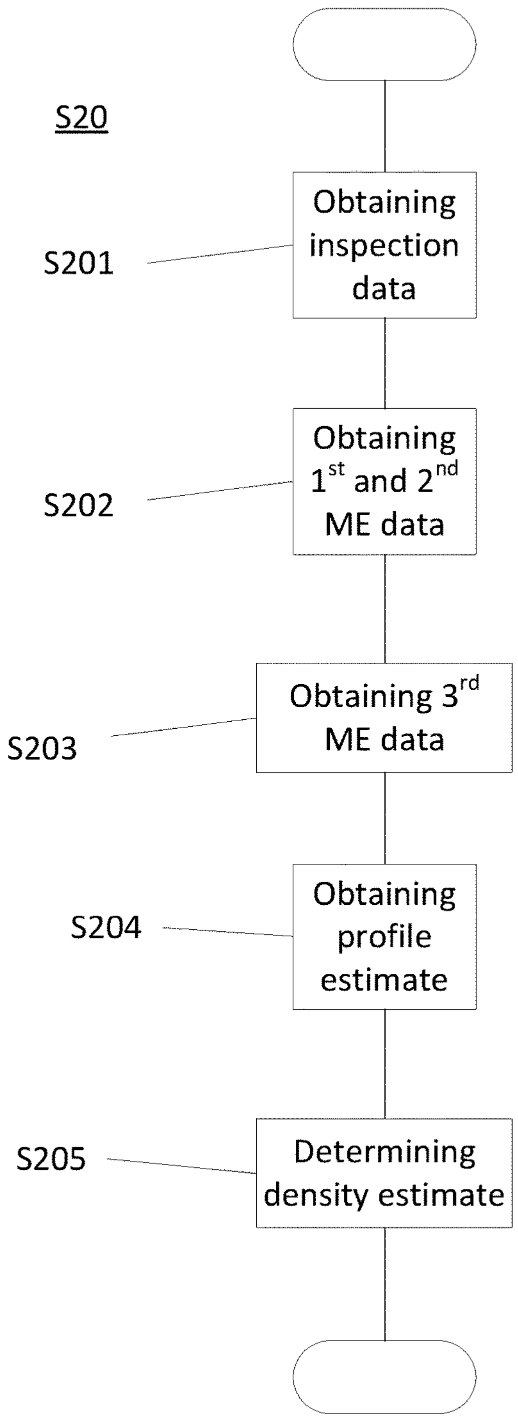
FIG. 6 schematically represents an example method according to the disclosure.

Example methods for determining, at S20, the density estimate using data received from the side-inspection device 5 are described below, with reference to FIG. 6.

Determining at S20 the density estimate may include:

- obtaining, at S201, inspection data measured by the side-inspection device, the inspection data being measured after transmission of the ionizing radiation through an upper part of the vehicle, including an upper part of the cargo,
- obtaining, at S202, first mass equivalence data associated with the irradiated upper part of the vehicle not including the cargo, the first mass equivalence data being with respect to a reference material, based on the obtained inspection data,
- obtaining, at 202, second mass equivalence data associated with the irradiated upper part of the vehicle, including the upper part of the cargo, the second mass equivalence data being with respect to the reference material, based on the obtained inspection data,
- obtaining, at S203, third mass equivalence data associated with the irradiated upper part of the cargo, based on the obtained first mass equivalence data and the obtained second mass equivalence data,
- obtaining, at S204, one or more estimates of profiles of a top surface of the cargo in the open-topped vehicle, based on the data obtained from the top-observation device;
- determining, at S205, the density estimate, based on the obtained third mass equivalence data and the obtained one or more profile estimates.

Figure 7:
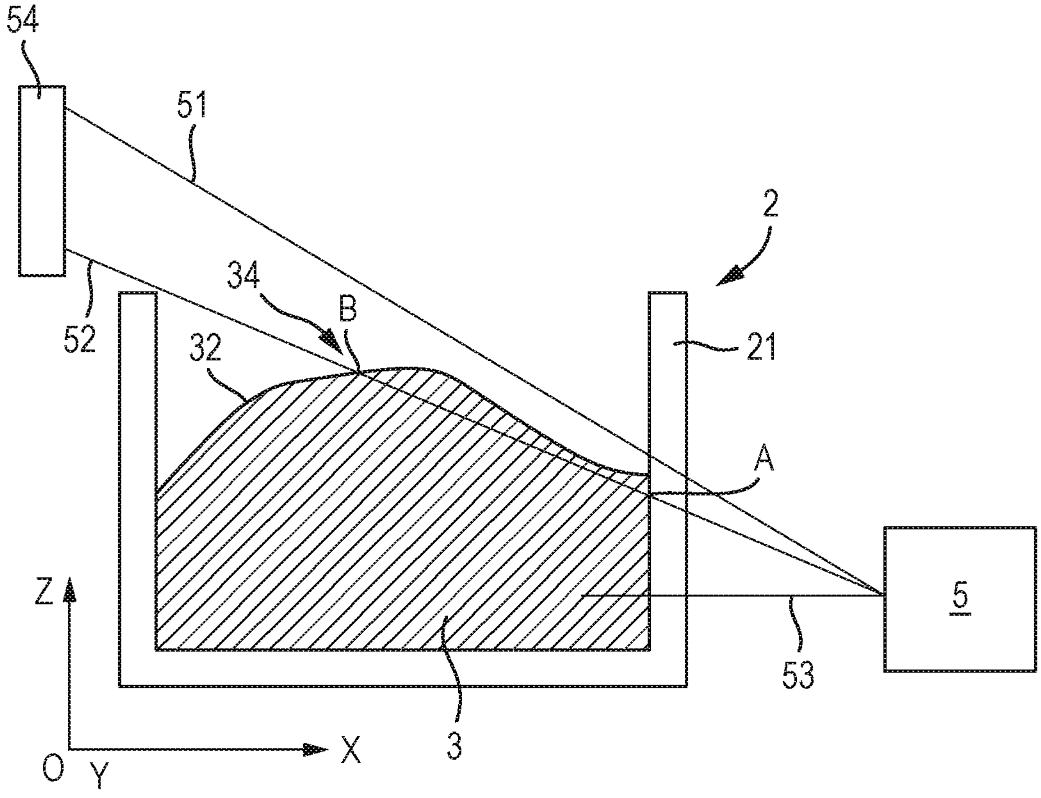
FIG. 7 schematically represents a cross-section of an example side-inspection device configured to inspect the cargo in the open-topped vehicle, according to the disclosure, and FIG. 8 schematically represents an example method according to the disclosure.

As illustrated in FIG. 7, although some ionizing radiation (e.g. radiation ray 53) may be blocked by a high-density or high-thickness cargo 3, there are zones of the cargo 3 where the ionizing radiation is at least partially transmitted (e.g. radiation ray 51 and radiation ray 52), because the thickness of cargo to cross is null or not great enough to block the radiation, and inspection data measured by the side-inspection device 5 (e.g. by detectors 54 of the side-inspection device 5) may be obtained. As illustrated in FIG. 7, radiation ray 51 and radiation ray 52 are not fully absorbed by the cargo 3. As illustrated in FIG. 7, the inspection data is measured after transmission of the ionizing radiation (e.g. radiation ray 51 and radiation ray 52) through an upper part of the vehicle, including an upper part 34 of the cargo 3.

Mass equivalence data may be obtained at S202 and S203, based on the inspection data obtained at S201. Mass equivalence data of any given material (such as the material of the cargo, as non-limiting examples), with respect to a reference material, corresponds to a thickness of an object made of the reference material, associated with a same radiation transmission, on detectors 54 of the side-inspection device 5, as a radiation transmission associated with a thickness of an object made of the given material. The mass equivalence is expressed in $g \cdot cm^{-2}$.

As already stated, in some cases, the type of the cargo 3 may be known: e.g. it may be known that the cargo 3 is iron ore (as a non-limiting example), because the cargo is provided by a regular provider—e.g. a known mining company. Alternatively or additionally, the type of the cargo 3 may be estimated, e.g. using information from an observation of the cargo 3, e.g. by an operator of the system 1. The material of the cargo 3 (e.g. iron as a non-limiting example, for the cargo being iron ore) may be chosen as the reference material for the mass equivalence data.

The inspection data for ray 51 corresponds to the irradiated upper part of the vehicle 2 not including the cargo 3 (i.e. inspection data associated with a wall 21 of the vehicle in FIG. 7). At S202 first mass equivalence data associated with the inspection data for ray 51 (e.g. the mass equivalence data associated with the wall 21 of the vehicle in FIG. 7) may be obtained.

The inspection data for ray 52 corresponds to the irradiated upper part of the vehicle 2, including the upper part of the cargo 3. At S202 second mass equivalence data associated with the inspection data for ray 52 (i.e. the mass equivalence data of the cargo 3 between point A and B plus the mass equivalence data of the wall 21 in FIG. 7) may be obtained.

At S203, third mass equivalence data associated with the irradiated upper part of the cargo (i.e. the mass equivalence data of the cargo 3 between point A and B in FIG. 7) may be obtained, based on the obtained first mass equivalence data and the obtained second mass equivalence data. In the example of FIG. 7, the difference between the obtained second mass equivalence data and the obtained first mass equivalence data corresponds to the third equivalence data of the upper part 34 of the cargo between A and B.

At S204, obtaining the one or more estimates of profiles of the top surface 32 of the cargo 3 in the open-topped vehicle 2, based on the data obtained from the top-observation device has already been explained with reference to FIG. 4. As the profile in FIG. 7 is known, the position of point B in space is well known. The position of point A is also known, because it corresponds to the inner part of the wall 21 at an angle given by the radiation ray 52. The distance between point A et point B may be determined.

As the mass equivalence of the upper part 34 of the cargo is expressed in $g \cdot cm^{-2}$, dividing the mass equivalence of the upper part 34 of the cargo by the distance AB enables determining the density of the cargo 3.

The density of the cargo 3 may be determined for each mutual position along the axis (OY), for a profile of the top surface 32. The method may thus include determining a series of density estimates for a series of locations along the side-inspection direction (e.g. the axis (OY)), and determining the density estimate by averaging the determined series of density estimates for the series of locations along the side-inspection direction. This enables a better precision on the density estimate.

After the density estimate ρ is obtained at S20, determining the mass estimate M at S2, based on the volume estimate V obtained at S2, is as follows:

$$M = V.\ \rho.$$

In example methods, determining at S2 the mass estimate of the cargo in the open-topped vehicle does not include obtaining an estimate of the density of the cargo in the open-topped vehicle. Examples of such methods are described below.

Figure 8:
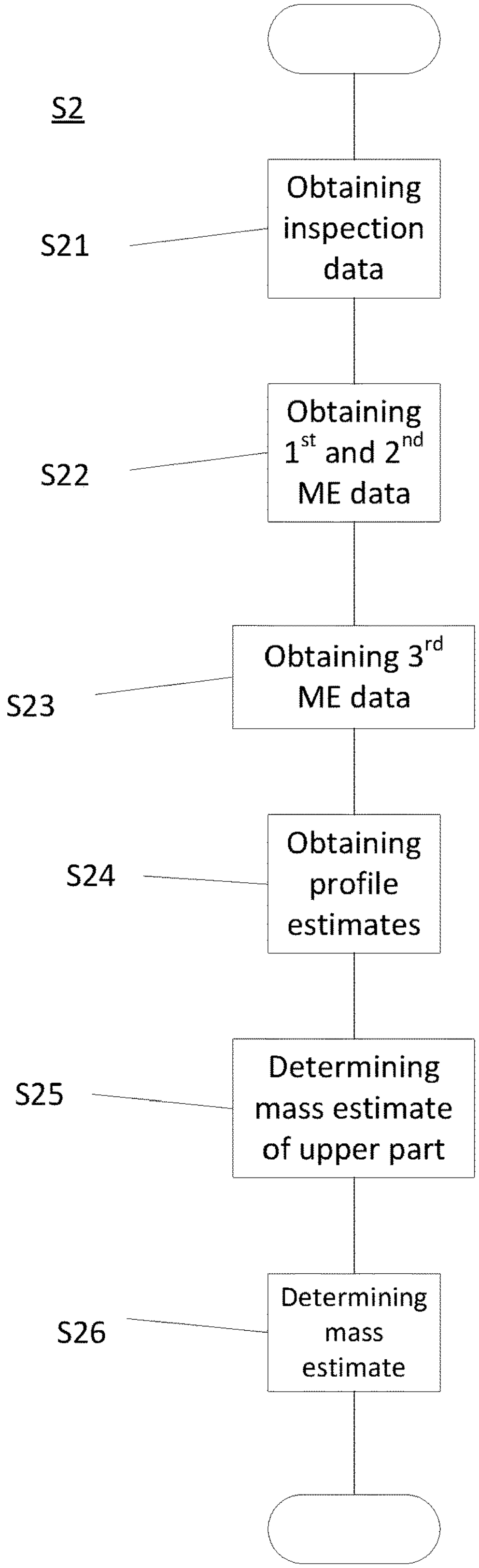

As illustrated in FIGS. 7 and 8, in such methods, determining the mass estimate at S2 includes:

- obtaining, at S21, inspection data measured by the side-inspection device, the inspection data being measured after transmission of the ionizing radiation through the upper part of the vehicle, including an upper part 34 of the cargo (as illustrated in FIG. 7),
- obtaining, at S22, first mass equivalence data associated with the irradiated upper part of the vehicle not including the cargo, the first mass equivalence data being with respect to a reference material, based on the obtained inspection data,
- obtaining, at S22, second mass equivalence data associated with the irradiated upper part of the vehicle, including the upper part 34 of the cargo, the second mass equivalence data being with respect to the reference material, based on the obtained inspection data,
- obtaining, at S23, third mass equivalence data associated with the irradiated upper part 34 of the cargo, based on the obtained first mass equivalence data and the obtained second mass equivalence data,
- obtaining, at S24, one or more estimates of profiles of a top surface of the cargo in the open-topped vehicle, based on the data obtained from the top-observation device,
- determining, at S25, the mass of the upper part 34 to the cargo, based on the obtained third mass equivalence data and the obtained one or more estimates of profiles,
- determining, at S26, the mass estimate of the cargo, based on the determined mass of the upper part 34 to the cargo and the determined volume estimate for the cargo in the open-topped vehicle.

Steps S21 to S24 of FIG. 8 have already been described with reference to steps S201 to 204 of FIG. 6.

At S24, and with reference to FIG. 7, the distance between point A et point B may be determined for each mutual position along the axis (OY). The method of FIG. 8 may thus include determining, at S24, a series of distances between respective points A et points B, for a series of locations along the side-inspection direction (e.g. the axis (OY)). As the profile in FIG. 7 is known for each mutual position along the axis (OY), the area of the upper part 34 of the cargo located below the top surface 32 and above the segment AB may be determined, for each mutual position along the axis (OY). As the mass equivalence of the upper part 34 of the cargo is expressed in $g\cdot cm^{-2}$, the mass of the upper part 34 of the cargo may be determined for each mutual position along the axis (OY) by multiplication of the mass equivalence data by the determined area. By summing the corresponding mass for all of the series of mutual positions along the side-inspection direction (e.g. the axis (OY)), the mass m of the upper part 34 of the cargo, located below the top surface 32 and above the segment AB, may be determined at S25.

By summing the corresponding areas for all of the series of mutual positions along the side-inspection direction (e.g. the axis (OY)), the volume v of the upper part 34 of the cargo may be determined at S26.

After the mass m and the volume v are obtained at S25 and S26, respectively, determining the mass estimate M at S2, based on the volume estimate V obtained at S2, is as follows:

$$M = m\ V/v.$$

In some examples, comparing at S3 the determined mass estimate M with the known reference mass $M_{ref}$, such as the mass which has been previously declared e.g. to border officials, includes comparing the determined mass estimate with a predetermined threshold above the known reference mass. The threshold may be determined by an operator of the system 1, to avoid detection of false positives. The threshold may correspond to an estimate of an equivalent ore mass corresponding to a minimum quantity of hidden contraband.

Additionally or alternatively, in cases where determining the estimate of the characteristic of the cargo in the open-topped vehicle includes determining the estimate of the volume of the cargo in the open-topped vehicle, comparing at S3 the determined volume estimate with the reference characteristic may further include determining a reference volume $V_{ref}$ of the cargo.

The reference volume $V_{ref}$ may be determined by dividing the reference mass $M_{ref}$ of the cargo, such as the mass which has been previously declared e.g. to border officials, by the obtained density estimate p. As already explained, the density estimate may be obtained by using the data from the side-inspection device 5 or by prior knowledge of the type of the cargo 3.

The reference volume $V_{ref}$ may be determined such that:

$$V_{ref} = M_{ref}/\rho$$

In such examples, comparing at S3 the volume estimate V of the cargo with the determined reference volume $V_{ref}$, may include comparing the determined volume estimate with a predetermined threshold above the reference volume $V_{ref}$. The threshold may be determined by an operator of the system 1, to avoid detection of false positives. The threshold may correspond to an estimate of an equivalent cargo volume corresponding to a minimum quantity of hidden contraband.

As illustrated in FIG. 1, in some examples, if the determined mass estimate M or the determined volume estimate V is greater than the predetermined threshold above the known reference mass $M_{ref}$ or the reference volume $V_{ref}$, respectively, the method 100 may include determining at S3 that the cargo in the open-topped vehicle is not in conformity with the reference characteristic. In that case, as illustrated in FIG. 3B, the method 100 of FIG. 1 may further include determining, at S4, that the cargo 3 in the open-topped vehicle is likely to contain an object 31 of interest.

The object 31 of interest may include at least one of contraband, such as cigarettes, or drugs and weapon, such as explosives. The given examples are non-limiting and other objects of interest are envisaged.

The method 100 may further include triggering an alarm for the operator of the system 1 when it is determined that the cargo in the open-topped vehicle is likely to contain the object of interest.

The invention claimed is:

1. A computer-implemented method for inspecting cargo in an open-topped vehicle, comprising:

1) Obtaining data from a top-observation device, the top-observation device being configured to observe a top surface of the cargo in the open-topped vehicle during a mutual movement of the open-topped vehicle and the top-observation device;

2) determining an estimate of at least one characteristic of the cargo in the open-topped vehicle, based on the obtained data, wherein determining the estimate of the at least one characteristic of the cargo comprises determining an estimate of a volume of the cargo in the open-topped vehicle, comprising at least one of:

determining the volume estimate using data received from the top-observation device, and receiving the volume estimate from the top-observation device, and determining a mass estimate, comprising:

obtaining inspection data measured by a side-inspection device configured to inspect the cargo using ionizing radiation during a mutual movement of the open-topped vehicle and the side-inspection device, the inspection data being measured after transmission of the ionizing radiation through an upper part of the vehicle, including an upper part of the cargo, obtaining first mass equivalence data associated with the irradiated upper part of the vehicle not including the cargo, the first mass equivalence data being with respect to a reference material, based on the obtained inspection data, obtaining second mass equivalence data associated with the irradiated upper part of the vehicle, including the upper part of the cargo, the second mass equivalence data being with respect to the reference material, based on the obtained inspection data, obtaining third mass equivalence data associated with the irradiated upper part of the cargo, based on the obtained first mass equivalence data and the obtained second mass equivalence data, obtaining one or more estimates of profiles of a top surface of the cargo in the open-topped vehicle, based on the data obtained from the top-observation device, determining the mass of the upper part to the cargo, based on the obtained third mass equivalence data and the obtained one or more estimates of profiles, determining the mass estimate of the cargo, based on the determined mass of the upper part to the cargo and the determined volume estimate for the cargo in the open-topped vehicle wherein determining the volume estimate comprises:

obtaining estimates of profiles of the top surface of the cargo in the open-topped vehicle, based on the data obtained from the top-observation device;

obtaining an estimate of a height of the cargo under the top surface of the cargo in the open-topped vehicle;

determining the volume estimate, based on the obtained profile estimates and the obtained height estimate;

3) comparing the determined characteristic estimate with a reference characteristic associated with the cargo in the open-topped vehicle; and 4) determining whether the cargo in the open-topped vehicle is in conformity with the reference characteristic, based on the comparing.

2. The method of claim 1, wherein comparing the determined characteristic estimate with the reference characteristic comprises:

comparing the determined mass estimate with a reference mass of the cargo, the method further comprising:

comparing the determined mass estimate with a predetermined threshold above the reference mass, and if the determined mass estimate is greater than the predetermined threshold above the reference mass, the method comprising determining that the cargo in the open-topped vehicle is not in conformity with the reference mass, the method further comprising:

determining that the cargo in the open-topped vehicle is likely to contain an object of interest.

3. The method of claim 2, further comprising triggering an alarm when it is determined that the cargo in the open-topped vehicle is likely to contain the object of interest.

4. The method of claim 2, wherein the object of interest comprises at least one of contraband, cigarettes, drugs, weapon, and explosives.

5. The method of claim 1, wherein determining the estimate of at least one characteristic of the cargo in the open-topped vehicle further comprises obtaining an estimate of the density of the cargo in the open-topped vehicle.

6. The method of claim 5, wherein obtaining the estimate of the density comprises at least one of:

determining the density estimate using data received from a side-inspection device configured to inspect the cargo using ionizing radiation during a mutual movement of the open-topped vehicle and the side-inspection device, receiving the density estimate from the side-inspection device, and assigning at least one of a predetermined reference density or a predetermined density estimate to the density estimate.

7. The method of claim 6, wherein determining the density estimate using data received from the side-inspection device comprises:

obtaining inspection data measured by the side-inspection device, the inspection data being measured after transmission of the ionizing radiation through an upper part of the vehicle, including an upper part of the cargo, obtaining first mass equivalence data associated with the irradiated upper part of the vehicle not including the cargo, the first mass equivalence data being with respect to a reference material, based on the obtained inspection data, obtaining second mass equivalence data associated with the irradiated upper part of the vehicle, including the upper part of the cargo, the second mass equivalence data being with respect to the reference material, based on the obtained inspection data, obtaining third mass equivalence data associated with the irradiated upper part of the cargo, based on the obtained first mass equivalence data and the obtained second mass equivalence data, obtaining one or more estimates of profiles of a top surface of the cargo in the open-topped vehicle, based on the data obtained from the top-observation device, and determining the density estimate, based on the obtained third mass equivalence data and the obtained one or more profile estimates.

8. The method of claim 7, comprising:

determining a series of density estimates for a series of locations along the side-inspection direction, and determining the density estimate by averaging the determined series of density estimates for the series of locations along the side-inspection direction.

9. The method of claim 5, wherein determining the estimate of the at least one characteristic of the cargo further comprises:

determining the mass estimate M of the cargo, based on the volume estimate V, using the determined density estimate ρ, by:

$$M = V.\ \rho.$$

10. The method of claim 9, wherein comparing the determined characteristic estimate with the reference characteristic comprises:

comparing the determined mass estimate with a reference mass of the cargo, the method further comprising:

comparing the determined mass estimate with a predetermined threshold above the reference mass, and if the determined mass estimate is greater than the predetermined threshold above the reference mass, the method comprising determining that the cargo in the open-topped vehicle is not in conformity with the reference mass, the method further comprising:

determining that the cargo in the open-topped vehicle is likely to contain an object of interest.

11. The method of claim 5, wherein comparing the determined characteristic estimate with the reference characteristic further comprises:

determining a reference volume $V_{ref}$ of the cargo by dividing a reference mass $M_{ref}$ of the cargo by the obtained density estimate ρ, such that:

$$V_{ref} = M_{ref}/\rho$$

comparing the volume estimate of the cargo with the determined reference volume $V_{ref}$, comprising comparing the determined volume estimate with a predetermined threshold above the reference volume $V_{ref}$, and if the determined volume estimate is greater than the predetermined threshold above the reference volume, the method comprising determining that the cargo in the open-topped vehicle is not in conformity with the reference characteristic, the method further comprising:

determining that the cargo in the open-topped vehicle is likely to contain an object of interest.

12. The method of claim 1, wherein the side-inspection device comprises an ionizing radiation scanner, mounted fixed with respect to the ground, the open-topped vehicle being mobile with respect to the ground.

13. The method of claim 1, wherein the open-topped vehicle comprises at least one of an open-topped gondola-type wagon or an open-topped truck trailer.

14. The method of claim 1, wherein the cargo in the open-topped vehicle comprises a load of high-density material.

15. The method of claim 1, further comprising determining one or more mutual positions of the vehicle and the top-observation device along an axis of the mutual movement of the open-topped vehicle and the top-observation device.

16. A system comprising:

a processor; and a memory storing instructions which, when executed by the processor, enable the system to perform a method according to claim 1.

17. A computer-implemented method for inspecting cargo in an open-topped vehicle, comprising:

1) Obtaining data from a top-observation device, the top-observation device being configured to observe a top surface of the cargo in the open-topped vehicle during a mutual movement of the open-topped vehicle and the top-observation device;

wherein the top-observation device comprises at least one of one or more Lidar scanners and one or more millimetre-wave scanners, the top-observation device being mounted fixed with respect to the ground, the open-topped vehicle being mobile with respect to the ground, 2) determining an estimate of at least one characteristic of the cargo in the open-topped vehicle, based on the obtained data, 3) comparing the determined characteristic estimate with a reference characteristic associated with the cargo in the open-topped vehicle; and 4) determining whether the cargo in the open-topped vehicle is in conformity with the reference characteristic, based on the comparing.

* * * * *